(12) United States Patent
Nakamura

(10) Patent No.: US 12,297,866 B2
(45) Date of Patent: May 13, 2025

(54) FOLLOWER BEARING

(71) Applicant: NIPPON THOMPSON CO., LTD., Tokyo (JP)

(72) Inventor: Tomoaki Nakamura, Mino (JP)

(73) Assignee: NIPPON THOMPSON CO., LTD., Tokyo (JP)

(*) Notice: Subject to any disclaimer, the term of this patent is extended or adjusted under 35 U.S.C. 154(b) by 103 days.

(21) Appl. No.: 18/001,035

(22) PCT Filed: Apr. 30, 2021

(86) PCT No.: PCT/JP2021/017179
§ 371 (c)(1),
(2) Date: Dec. 7, 2022

(87) PCT Pub. No.: WO2021/251027
PCT Pub. Date: Dec. 16, 2021

(65) Prior Publication Data
US 2023/0220880 A1   Jul. 13, 2023

(30) Foreign Application Priority Data
Jun. 8, 2020   (JP) .................................. 2020-099452

(51) Int. Cl.
*F16C 33/58*   (2006.01)
*F16C 19/26*   (2006.01)

(52) U.S. Cl.
CPC ............ *F16C 33/585* (2013.01); *F16C 19/26* (2013.01)

(58) Field of Classification Search
CPC ....... F16C 33/588; F16C 19/26; F16C 33/581
See application file for complete search history.

(56) References Cited

U.S. PATENT DOCUMENTS 3,885,840 A * 5/1975 Neder .................. F16C 33/588
  384/536
4,113,328 A * 9/1978 Vander Meulen ... F16J 15/3252
  384/492

(Continued)

FOREIGN PATENT DOCUMENTS

DE   102014204745 A1   9/2015
JP   61-857621 U   6/1986

(Continued)

OTHER PUBLICATIONS

Mar. 22, 2025 Office Action issued in Chinese Patent Application No. 202180040776.4.

*Primary Examiner* — James Pilkington
*Assistant Examiner* — Aimee Tran Nguyen
(74) *Attorney, Agent, or Firm* — Oliff PLC

(57) ABSTRACT

A follower bearing 1 includes: a shaft 30 having an outer peripheral surface including an annular first raceway surface 11; an outer ring 60 having an inner peripheral surface including an annular second raceway surface 41 facing the first raceway surface 11; and a plurality of rollers 70 disposed on an annular raceway along the first raceway surface 11 and the second raceway surface 41 to be in contact with the first raceway surface 11 and the second raceway surface 41. The outer ring 60 includes an annular first member 40 made of steel and an annular second member 50 made of a resin and covering outer peripheral surfaces 44A and 44B of the first member 40. The first member 40 includes a cylindrical portion 42 having a hollow cylindrical shape and including the second raceway surface, and a projection 43 extending radially outward from the cylindrical portion 42. Ends of the projection 43 in the axial direction are filled with the second member 50.

9 Claims, 5 Drawing Sheets

(56) References Cited

U.S. PATENT DOCUMENTS

| | | | | |
|---|---|---|---|---|
| 4,668,209 A * | 5/1987 | Kyoosei | ................. | F16H 55/48 |
| | | | | 264/328.8 |
| 11,815,130 B2 * | 11/2023 | Nakamura | ............ | F16C 13/006 |
| 2004/0165800 A1 * | 8/2004 | Kato | ................... | F16C 33/6677 |
| | | | | 384/470 |
| 2016/0091072 A1 | 3/2016 | Hartnett et al. | | |
| 2019/0032715 A1 * | 1/2019 | Kunishima | ................ | B60J 5/06 |

FOREIGN PATENT DOCUMENTS

| | | | | |
|---|---|---|---|---|
| JP | 3-7527 U | | 1/1991 | |
| JP | 04275137 A | * | 9/1992 | ......... B29C 45/1459 |
| JP | 2009-191900 A | | 8/2009 | |

\* cited by examiner

FOLLOWER BEARING

TECHNICAL FILED

The present disclosure relates to a follower bearing.

This application claims priority to Japanese Patent Application No. 2020-99452, which was filed on Jun. 8, 2020, and is incorporated herein by reference in its entirety.

BACKGROUND ART

A rolling bearing in which an outer ring and a resin pulley are integrated is known to date (see, for example, Patent Document 1). Patent Document 1 describes that the outer ring includes a radially outward flange at one end. Patent Document 1 proposes that an end face of the flange at one side in the axial direction is exposed from the resin pulley in order to enhance heat dissipation of the outer ring.

CITATION LIST

Patent Literature

Patent Document 1: Japanese Patent Application Publication No. 2009-191900

SUMMARY OF INVENTION

Technical Problem

In the follower bearing, reduction of operating noise, and further reduction of interference with other members in contact with the outer ring, are required in some cases. A configuration in which the outer peripheral surface of the outer ring is covered with resin can reduce operating noise and interference with other members. However, if the outer peripheral surface of the outer ring is covered such that the end face of the flange at one side in the axial direction is exposed as proposed in Patent Document 1, the resin might be separated from the outer ring in the axial direction. Then, reliability decreases. It is therefore an object of the present disclosure to provide a follower bearing that can reduce operating noise and interference with other members and can enhance reliability.

Solution to Problems

A follower bearing according to the present disclosure includes: an inner member having an outer peripheral surface, the outer peripheral surface including an annular first raceway surface; an outer ring having an inner peripheral surface, the inner peripheral surface including an annular second raceway surface facing the first raceway surface; and a plurality of rolling elements disposed on an annular raceway along the first raceway surface and the second raceway surface to be in contact with the first raceway surface and the second raceway surface. The outer ring includes an annular first member made of steel, and an annular second member made of a resin and covering an outer peripheral surface of the first member. The first member includes a cylindrical portion having a hollow cylindrical shape and including the second raceway surface, and a projection extending radially outward from the cylindrical portion. Ends of the projection in an axial direction are filled with the second member.

Advantages of Invention

The follower bearing can reduce operating noise and interference with other members and can enhance reliability.

DESCRIPTION OF EMBODIMENTS

Summary of Embodiment

Figure 1:
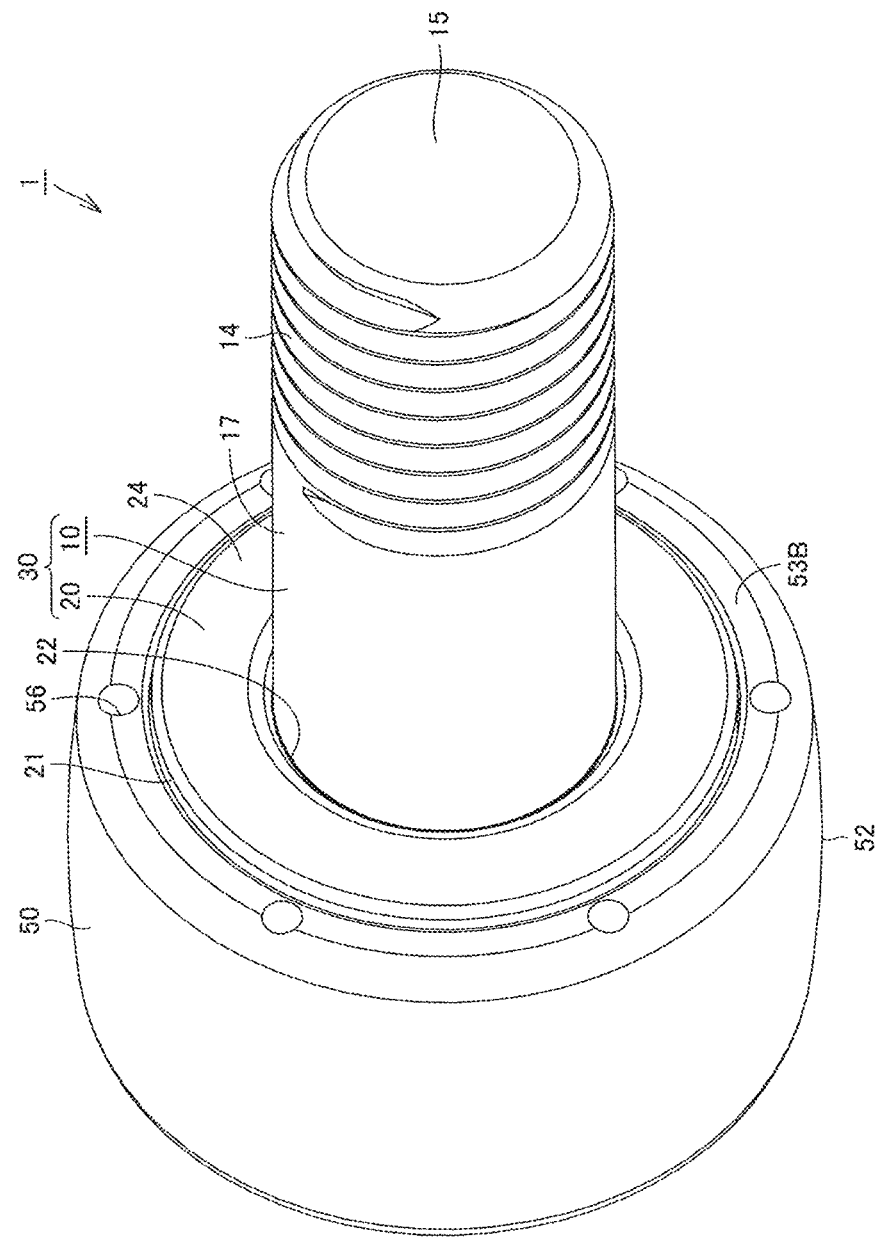
FIG. 1 is a perspective view schematically illustrating a configuration of a follower bearing.

A follower bearing according to the present disclosure includes: an inner member having an outer peripheral surface, the outer peripheral surface including an annular first raceway surface; an outer ring having an inner peripheral surface, the inner peripheral surface including an annular second raceway surface facing the first raceway surface; and a plurality of rolling elements disposed on an annular raceway along the first raceway surface and the second raceway surface to be in contact with the first raceway surface and the second raceway surface. The outer ring includes an annular first member made of steel, and an annular second member made of a resin and covering an outer peripheral surface of the first member. The first member includes a cylindrical portion having a hollow cylindrical shape and including the second raceway surface, and a projection extending radially outward from the cylindrical portion. Ends of the projection in an axial direction are filled with the second member.

In the follower bearing of the present disclosure, the outer ring includes the resin second member. Accordingly, reduction of interference with other members in contact with the outer ring and reduction of operating noise are achieved. In the follower bearing, the first member includes the projection extending radially outward from the cylindrical portion. Ends of the projection in the axial direction are filled with the second member. This configuration can reduce the possibility of separation of the steel first member and the resin second member in the axial direction. As a result, reliability can be enhanced. In this manner, the follower bearing can reduce operating noise and interference with other members and can enhance reliability. The "resin" herein includes rubber. That is, the second member may be made of rubber. The "resin second member" herein includes a second member made of a fiber-reinforced resin. That is, the resin constituting the second member may include reinforcing fibers. Examples of the reinforcing fibers include glass fibers and carbon fibers.

In the follower bearing, the projection may be connected to an end of the cylindrical portion. The first member having the projection with this configuration can be easily fabricated by using press work and drawing, for example.

In the follower bearing, the projection may have an annular shape continuous in an entire region of the first member in a circumferential direction. This configuration can further reduce the possibility of separation of the first member and the second member in the axial direction.

In the follower bearing, the second member may have a through hole extending straight from outside to the projection. The follower bearing can be provided with an acoustic emission (AE) sensor in order to detect abnormality of the bearing in some cases. The AE sensor can be used to detect sound (vibrations) of the outer ring to thereby detect abnormality of the follower bearing. Here, if the AE sensor is provided in the resin second member covering the outer peripheral surface of the first member, sound from the outer ring, the inner member, and the rolling element that are in rolling contact can be detected through the resin second member. Then, it is difficult to detect small sound. On the other hand, the follower bearing described above uses the through hole in placing the AE sensor so that the AE sensor is placed while being in contact with the projection. Thus, the possibility of attenuation of sound during transmission to the AE sensor can be reduced, and sound can be accurately detected by the AE sensor. As a result, in the follower bearing with this configuration, abnormality of the follower bearing can be accurately detected by using the through hole in detecting abnormality with the AE sensor. The expression "extending straight" herein means that two lines defined by the wall surface surrounding the through hole are each straight, and the two lines may be parallel or may form a tapered shape that becomes wider toward the opening.

In the follower bearing, the through hole may penetrate the second member in the axial direction. This configuration enables the AE, sensor to be easily placed in the through hole.

In the follower bearing, the projection may have a notch that is recessed radially inward. This configuration enables the second member to enter the notch. Thus, relative rotation of the first member to the second member can be restricted.

In the follower bearing, the notch may include a plurality of notches arranged with intervals in a circumferential direction of the first member. This configuration can further restrict relative rotation of the first member to the second member.

In the follower bearing, in a plan view seen in a direction in which the through hole extends, at least a part of a region defined by a wall surface surrounding the through hole may be located outside the notch. The through hole may be formed by using an ejector pin. Specifically, insert molding is performed in the manner described below to thereby fabricate the outer ring including the second member having the through hole. First, the first member is placed in a cavity, and positioned by bringing the ejector pin into contact with the first member, thereby injecting a resin. At this time, the ejector pin retains the position of the first member. Thereafter, the ejector pin is removed. Then, a through hole functioning as a hold in which an AE sensor is placed is formed. Here, at least a part of the region is located outside the notch so that the through hole in which the projection is brought into contact with the AE sensor to place the AE sensor is thereby formed.

In the follower bearing, the through hole may penetrate the second member in the axial direction. This configuration enables the AE sensor to be easily placed in the through hole.

In the follower bearing, the inner member may include a body including the first raceway surface, and a first protrusion having an annular shape whose center axis coincides with that of the first raceway surface, disposed at one side of the first raceway surface in the axial direction, and projecting radially outward from an outer periphery of the body.

The second member may include a first portion having an annular shape whose center axis coincides with that of the first raceway surface and configured to enter between the first protrusion and the first member. This configuration can avoid contact between the first protrusion and the first member in the axial direction. The first portion with this configuration can be formed with the ejector pin by positioning the first member in a cavity to form a space outside the projection in the axial direction and causing a resin to flow in this space.

In the follower bearing, the inner member may include a second protrusion having an annular shape whose center axis coincides with that of the first raceway surface, disposed at another side of the first raceway surface in the axial direction, and projecting radially outward from the outer periphery of the body. The second member include a second portion having an annular shape whose center axis coincides with that of the first raceway surface and configured to enter between the second protrusion and the first member. This configuration can avoid contact between the second protrusion and the first member in the axial direction.

In the follower bearing, the second member max have a region facing the inner member. A sealing portion having an annular shape whose center axis coincides with that of the first raceway surface and projecting toward the inner member may be formed in the region facing the inner member. This configuration can suppress entering of foreign matter into the bearing and leakage of, for example, grease to the outside of the bearing. In addition, the number of parts can be reduced, as compared to a case where a sealing member as a separate component is disposed between the outer ring and the inner member. The sealing portion may be in contact with the inner member at a front end thereof, or the front end of the sealing portion may face the inner member with a slight interval. That is, the sealing portion may be in contact with the inner member of may be slightly separated from the inner member as long as the sealing member suppresses entering of foreign matter into the bearing from the outside and leakage of, for example, grease from the inside of the bearing.

In the follower bearing, the resin constituting the second member may be at least a resin selected from the group consisting of polyamide, polyacetal, polyphenylene sulfide, polyamide-imide, polyimide, polyether ether ketone, and polyurethane. Polyamide, polyacetal, polyphenylene sulfide, polyamide-imide, polyimide, polyether ether ketone, and polyurethane are preferable as resins constituting the second member.

In the follower bearing, the rolling element may be a roller. With this configuration, a sufficient withstand load can be easily achieved while the height of the follower bearing in a cross section is reduced.

Specific Examples of Embodiment

A specific example of an embodiment of a follower bearing according to the present disclosure will now be described with reference to the drawings. In the following drawing, the same or corresponding parts are denoted by the same reference numerals, and the description thereof will not be repeated.

Figure 2:
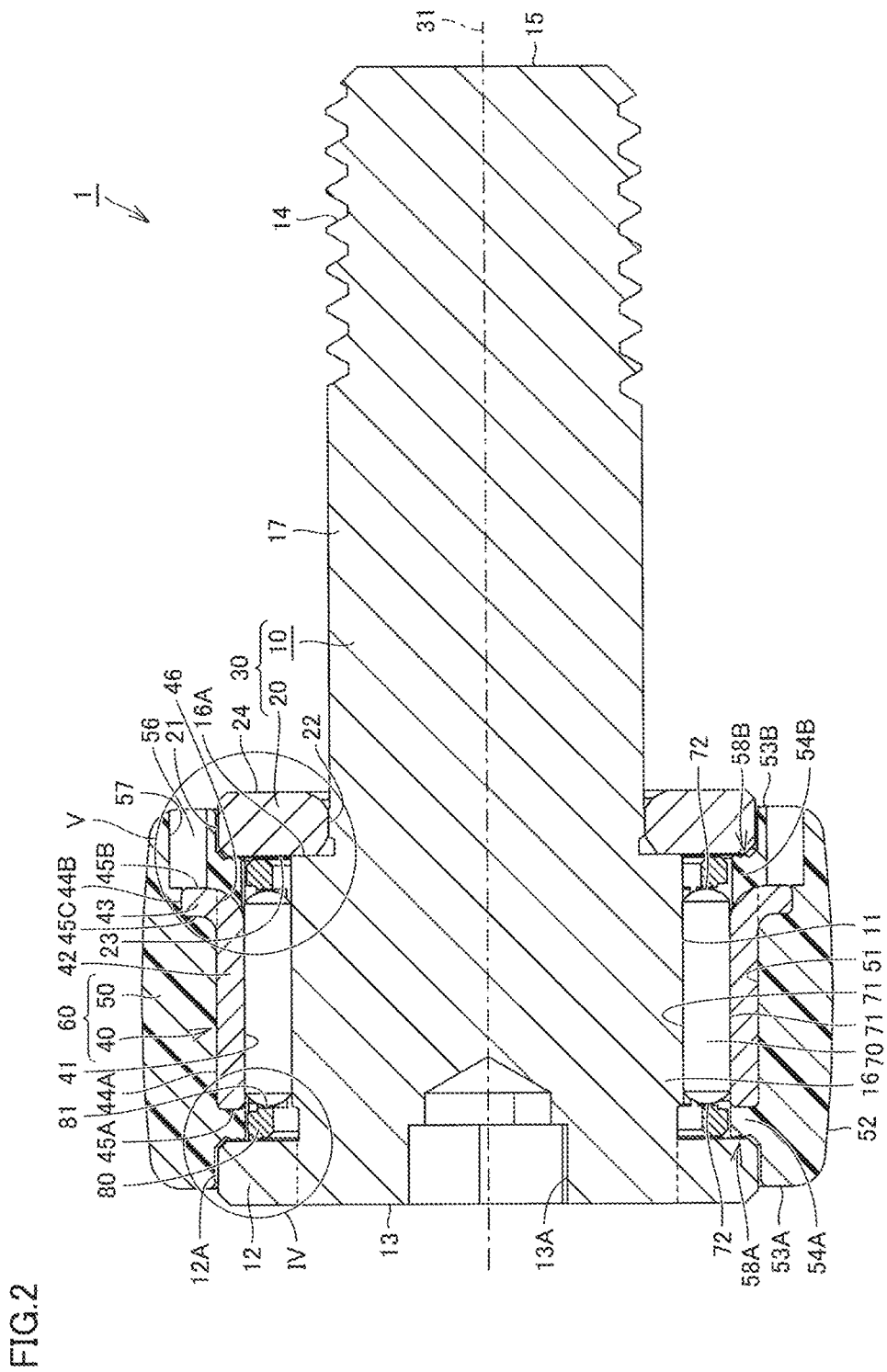
FIG. 2 is a cross-sectional view schematically illustrating the configuration of the follower bearing.
Figure 3:
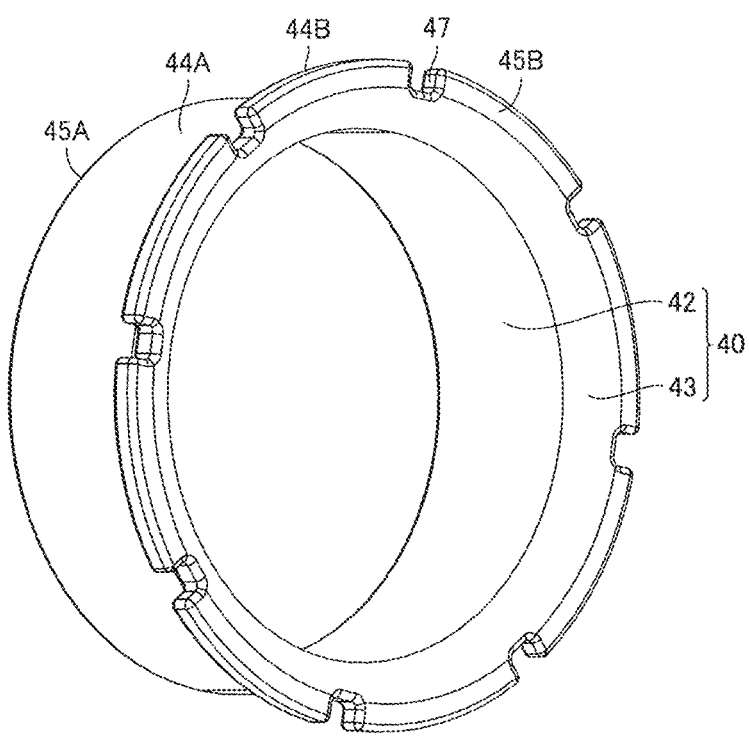
FIG. 3 is a perspective view schematically illustrating a configuration of a first member of an outer ring.
Figure 4:
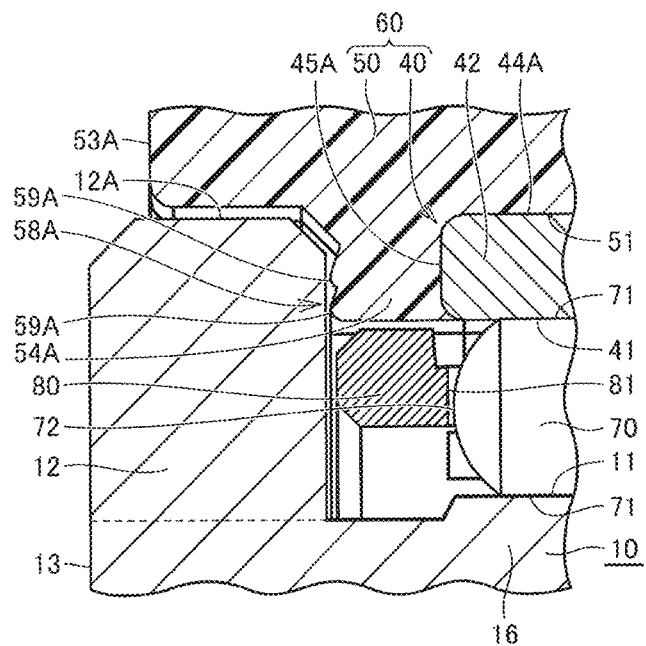
FIG. 4 is a cross-sectional view schematically illustrating a region IV in FIG. 2 in an enlarged manner.
Figure 5:
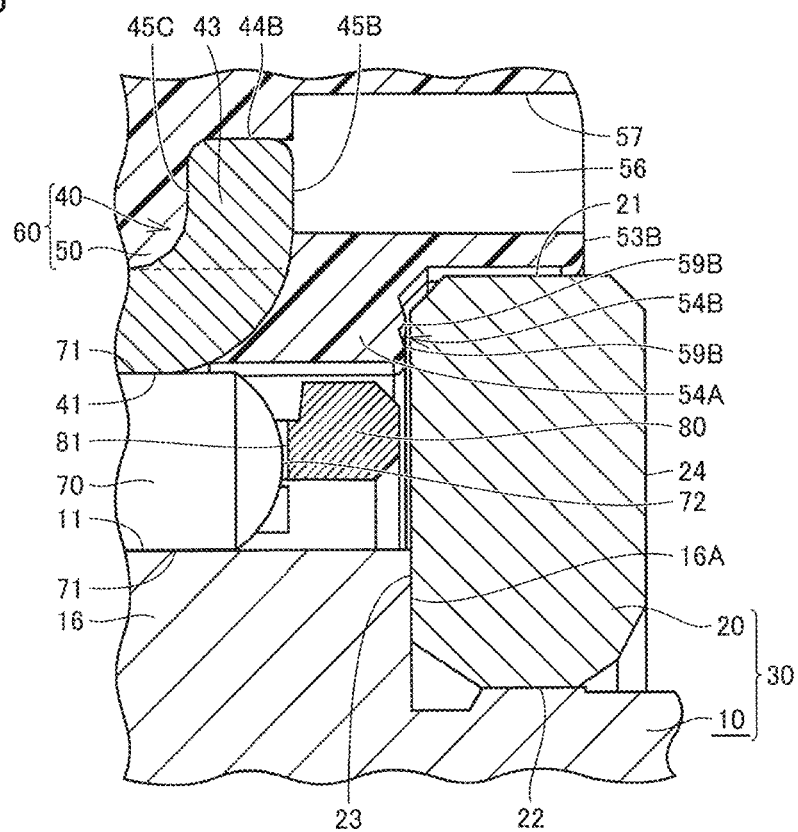
FIG. 5 is a cross-sectional view schematically illustrating a region V in FIG. 2 in an enlarged manner.

FIG. 1 is a perspective view schematically illustrating a structure of a follower bearing according to one embodiment of the present disclosure. FIG. 2 is a cross-sectional view schematically illustrating the structure of the follower bearing. FIG. 2 is a cross-sectional view taken in a plane including a rotation axis of the follower bearing. FIG. 3 is a perspective view schematically illustrating a configuration of a first member of an outer ring. FIG. 4 is a cross-sectional view schematically illustrating a region IV in FIG. 2 in an enlarged manner. FIG. 5 is a cross-sectional view schematically illustrating a region V in FIG. 2 in an enlarged manner.

With reference to FIGS. 1 through 5, a follower bearing 1 according to this embodiment includes a shaft 30 as an inner member, an outer ring 60, a plurality of rollers 70 as rolling elements, and a cage 80 for holding the rollers 70. In FIG. 2, a rotation axis 31 as a center axis of the shaft 30 is indicated by a chain line.

The shaft 30 includes a rod-shaped (solid cylindrical) body 10, a flange 12 formed at one end of the body 10 and having a larger diameter than that of the body 10, and a side plate 20 as a ring coaxially provided on the body 10 to surround a part of the outer peripheral surface of the body 10 in the circumferential direction. The body 10 has a first end face 13 at one end (first end) in the axial direction, and a second end face 15 at the other end (second end) opposite to the first end face 13. Each of the first end face 13 and the second end face 15 has a circular flat shape.

A hexagonal hole 13A having a regular hexagonal prism shape is formed in a region of the first end face 13 intersecting with the rotation axis 31 as the center axis of the shaft 30. A region of the body 10 including an end (second end) toward the second end face 15 is provided with a screw portion 14 having a helical screw groove. With this configuration, in placing the follower bearing 1, the follower bearing 1 can be fixed to a holder for holding the follower bearing 1 by screwing the screw portion 14 in a screw hole (not shown) formed in the holder and by inserting a part of a hexagonal wrench in the hexagonal hole 13A and tightening the wrench or by passing the shaft 30 through a housing hole and screwing a nut onto the screw portion 14.

The body 10 includes a solid cylindrical shaft 17 including the screw portion 14, and a large diameter portion 16 disposed between the shaft 17 and a region where the flange 12 is located in the axial direction and having a larger diameter than that of the shaft 17. The diameter of the large diameter portion 16 is smaller than the diameter of the flange 12. A first raceway surface 11 having a cylindrical shape is formed in the outer peripheral surface of the large diameter portion 16. That is, the shaft 30 has the annular first raceway surface 11 in the outer peripheral surface thereof. In this embodiment, a first protrusion having an annular shape whose center axis coincides with that of the first raceway surface 11, disposed at one end of the first raceway surface 11 in the axial direction, and projecting radially outward from the outer periphery of the body 10, is the flange 12. The outer periphery of the body 10 in the region where the flange 12 is located is indicated by broken lines in FIGS. 2, 4, and 5.

The annular side plate 20 includes a first end face 23 as one end face, a second end face 24 as the other end face, an outer peripheral surface 21, and an inner peripheral surface 22. The first end face 23 is parallel to the second end face 24. The outer peripheral surface 21 and the inner peripheral surface 22 are concentric cylindrical surfaces. The side plate 20 is disposed such that the first end face 23 is in contact with a step surface 16A (see FIGS. 2 and 5) that is an end face (step portion) of the large diameter portion 16 toward the shaft 17 in the axial direction. The side plate 20 has an inner diameter (diameter of the inner peripheral surface 22) corresponding to the outer diameter of the shaft 17. The side plate 20 is press fitted in the shaft 17 and fixed to the shaft 17. In this embodiment, a second protrusion having an annular shape whose center axis coincides with that of the first raceway surface 11, disposed at the other side of the first raceway surface 11 in the axial direction, and projecting radially outward from the outer periphery of the body 10, is the side plate 20. The shaft 30 is made of steel such as carbon steel for machine structure, alloy steel for machine structure, or bearing steel. A region of the shaft 30 including at least the first raceway surface 11 of the body 10 may be hardened by quenching. A part or whole of the side plate 20 may be hardened by quenching.

The inner peripheral surface of the outer ring 60 includes an annular second raceway surface 41 facing the first raceway surface 11. The outer ring 60 includes a first member 40 and a second member 50. The first member 40 includes a cylindrical portion 42 having a hollow cylindrical shape and including the second raceway surface 41, and a projection 43 extending radially outward from the cylindrical portion 42. The first member 40 is made of steel. Examples of the steel constituting the first member 40 include mild steel, carbon steel for machine structure, and alloy steel for machine structure. The first member 40 may be hardened by quenching. The first member 40 may be shaped by press work or drawing by using a steel plate of, for example, mild steel.

The cylindrical portion 42 includes a second raceway surface 41 as an inner peripheral surface, an outer peripheral surface 44A, a first end face 45A as one end face in the axial direction, and a second end 46 (the other end in the axial direction). The first member 40 includes the second raceway surface 41. The first end face 45A of the first member 40 and the flange 12 are opposed to each other. That is, the flange 12 and the first member 40 are opposed to each other in the axial direction.

The projection 43 is connected to the second end 46 of the cylindrical portion 42. The projection 43 has a plate shape. The projection 43 has an annular shape continuous in an entire region of the first member 40 in the circumferential direction. The projection 43 includes a second end face 45B as the other end face in the axial direction, an outer peripheral surface 44B, and a side surface 45C located at the opposite side to the second end face 45B in the axial direction. The boundary between the second end 46 and the projection 43 is indicated by broken lines in FIGS. 2 and 5. The second end face 45B and the first end face 23 of the side plate 20 are opposed to each other. That is, the side plate 20 and the first member 40 are opposed to each other in the axial direction.

The projection 43 has a plurality of notches 47 that are recessed radially inward (see especially FIG. 3). The notches 47 are arranged with intervals in the circumferential direction. The notches 47 penetrate the plate-shaped projection 43 in the thickness direction.

The second member 50 has an annular shape. The second member 50 is made of a resin. The resin constituting the second member 50 may be at least one resin selected from the group consisting of polyamide, polyacetal, polyphenylene sulfide, polyamide-imide, polyimide, polyether ether ketone, and a polyurethane group, for example. The second member 50 is disposed coaxially with the first member 40. The second member 50 covers the entire outer peripheral surfaces 44A and 44B of the first member 40. The second member 50 also covers the first end face 45A, the second end face 45B, and the side surface 45C of the first member 40. That is, ends of the projection 43 in the axial direction are filled with the second member 50.

The second member 50 includes an inner peripheral surface 51, an outer peripheral surface 52, a first end face 53A, and a second end face 53B. The second member 50 includes a first portion 54A having an annular shape whose center axis coincides with that of the first raceway surface 11 and configured to enter between the flange 12 as the first protrusion and the first member 40. The first portion 54A is formed in the entire periphery of the inner peripheral surface 51. The second member 50 includes a second portion 54B having an annular shape whose center axis coincides with that of the first raceway surface 11 and configured to enter between the side plate 20 as the second protrusion and the first member 40. The second portion 54B is formed in the entire periphery of the inner peripheral surface 51. Although not shown, the second member 50 also enter the notches 47 described above.

The second member 50 has a plurality of through holes 56 each extending straight from outside to the projection 43. In each of the through holes 56, two lines defined by a wall surface 57 surrounding the through holes 56 are straight lines in a cross section including the rotation axis 31. In this embodiment, the two straight lines are in parallel. The through holes 56 penetrate the second member 50 in the axial direction. The through holes 56 are arranged with intervals in the circumferential direction.

The cage 80 has an annular shape. In this embodiment, the cage 80 is made of steel, but a resin cage may be employed. The cage 80 is disposed coaxially with the shaft 30 and the outer ring 60 in a gap between the shaft 30 and the outer ring 60. A plurality of pockets 81 are arranged at regular intervals in the circumferential direction in the cage 80. One roller 70 is disposed in each of the pockets 81. The rollers 70 are thus held by the cage 80 so that the rollers 70 are thereby disposed on an annular raceway along the first raceway surface 11 and the second raceway surface 41 and are in contact with the first raceway surface 11 and the second raceway surface 41. Each of the rollers 70 has a solid cylindrical shape. Each of the rollers 70 has a cylindrical outer peripheral surface 71 and a pair of spherical end faces 72. Each of the end faces 72 of the rollers 70 may be flat. The outer peripheral surfaces 71 of the rollers 70 are in contact with the first raceway surface 11 and the second raceway surface 41. The rollers 70 are made of steel such as bearing steel. The rollers 70 may be hardened by quenching.

The second member 50 includes a first region 58A facing the flange 12 as the first protrusion in the axial direction. The first region 58A is included in the first portion 54A. The first region 58A has a plurality of first sealing portions 59A each having an annular shape whose center axis coincides with that of the first raceway surface 11 and projecting in the axial direction toward the flange 12. Front ends of the first sealing portions 59A are in contact with the flange 12. In this embodiment, the plurality of, more specifically two, (double-lip) first sealing portions 59A are arranged with intervals in the radial direction.

The second member 50 includes a second region 58B facing the side plate 20 as a second protrusion in the axial direction. The second region 58B included in a second portion 54B. The second region 58B has a plurality of second sealing portions 59B each having an annular shape whose center axis coincides with that of the first raceway surface 11 and projecting in the axial direction toward the side plate 20. Front ends of the second sealing portions 59B are in contact with the side plate 20. In this embodiment, the plurality of, more specifically two, (double-lip) second sealing portions 59B are arranged with intervals in the radial direction. That is, in this embodiment, the first sealing portions 59A and the second sealing portions 59B are disposed to close both ends of a gap between the shaft 30 and the outer ring 60 in the axial direction. The first sealing portions 59A and the second sealing portions 59B are part of the second member 50, and integrated with the second member 50.

The thus-configured outer ring 60 can be fabricated by, for example, the following process. For example, the first member 40 having the structure described above is prepared, and placed in a cavity of a mold beforehand. Here, an ejector pin is used such that an end face of the ejector pin is pressed against the end face 45B of the projection 43 to support the end face 45B. In this manner, the first member 40 is positioned at one side in the axial direction. Next, a resin is injected into the cavity from the other side in the axial direction. At this time, at the other side in the axial direction, the end face 45B of the projection 43 is pushed against the end face of the ejector pin under a pressure of the resin injection so that the first member 40 is fixed in the axial direction. In this manner, the outer ring 60 in which the first member 40 and the second member 50 are integrated is molded. After the molding, the ejector pin is removed. Then, space from which the ejector pin has been removed becomes the through holes 56 each extending straight from outside to the projection 43.

In the follower bearing 1 according to this embodiment, the shaft 30, the outer ring 60, the cage 80, and the plurality of rollers 70 are arranged as described above so that the outer ring 60 is thereby rotatable relative to the shaft 30 in the circumferential.

In the follower bearing 1 according to this embodiment, the outer ring 60 includes the second member 50 made of a resin. Accordingly, as compared to the case of using a follower bearing in which the outer peripheral surface of an outer ring is made of steel, reduction of interference in contact with the outer peripheral surface 52 of the outer ring 60 and reduction of operating noise are achieved. In addition, frequency of supply of a lubricant to a gap between the outer peripheral surface 52 of the outer ring 60 and the other members is reduced, or supply of the lubricant is stopped. Accordingly, maintenance can be reduced or eliminated. From this viewpoint, as the resin constituting the second member 50, a resin having self lubricity, such as polyacetal, is preferably employed. When supply of the lubricant is stopped, the follower bearing can be easily applied to applications that require prevention of spattering of oil, such as food production, and a processing device, a medical equipment, a semiconductor device, and so forth. In addition, since the outer ring 60 includes the resin second member 50, occurrence of rust in a contact portion with the other members can be suppressed. Consequently, no rust occurs in the second member 50, and thus, occurrence of rust in a member in contact with the second member 50 can be prevented. Furthermore, occurrence of dust due to scattering of rust is suppressed, and the follower bearing can be easily used for applications that require reduction of occurrence of dust, for example, a semiconductor manufacturing apparatus, an electronic component manufacturing apparatus, and so forth. Moreover, since the outer ring 60 includes the resin second member 50, chemical resistance in a contact portion with the other members can be enhanced.

In the follower bearing 1 according to this embodiment, the first member 40 includes the cylindrical portion 42 having the hollow cylindrical shape and including the second raceway surface 41, and the projection 43 extending radially outward from the cylindrical portion 42. In the axial direction, ends of the projection 43 in the axial direction are filled with the second member 50. Thus, the possibility of separation of the first member 40 and the second member 50 in the axial direction can be reduced. Thus, the follower bearing 1 described above serves as a follower bearing whose reliability can be enhanced.

In the follower bearing 1 according to this embodiment, the projection 43 is connected to the end 46 of the cylindrical portion 42 in the axial direction. Thus, the first member 40 having the thus-configured projection 43 can be easily fabricated by press work or drawing, for example. The shape of the projection 43 is not limited to the example described in the embodiment, and a shape in which the projection 43 is bent radially outward and then folded toward the outer peripheral surface 44A of the cylindrical portion 42 is appropriately selected. The projection 43 may be formed at each end of the cylindrical portion 42 in the axial direction.

In the follower bearing 1 according to this embodiment, the projection 43 has an annular shape continuous in an entire region of the first member 40 in the circumferential direction. The follower bearing 1 including the thus-configured first member 40 serves as a follower hearing that can further reduce the possibility of separation of the first member 40 and the second member 50 in the axial direction.

In the follower bearing 1 according to this embodiment, the second member 50 has the through holes 56 each extending straight from outside to the projection 43. Thus, in a case where an acoustic emission (AE) sensor is provided in the follower bearing 1 in order to detect abnormality of the bearing, the through holes 56 are used such that the AE sensor is placed while being in contact with the projection 43. Thus, the possibility of attenuation of sound during transmission to the AE sensor can be reduced and sound can be accurately detected by the AE sensor. As a result, the follower bearing 1 described above serves as a follower bearing that can accurately detect abnormality with the AE sensor.

In the follower bearing 1 according to this embodiment, the through holes 56 penetrate the second member 50 in the axial direction. Thus, the follower bearing 1 serves as a follower bearing in which the AE sensor can be easily placed in the through holes 56.

In the follower bearing 1 according to this embodiment, the projection 43 has notches 47 that are recessed radially inward. Thus, the second member 50 is allowed to enter the inside of the notches 47. Accordingly, the follower bearing 1 described above serves as a follower bearing that can restrict relative rotation of the first member 40 to the second member 50.

In the follower bearing 1 according to this embodiment, the plurality of notches 47 are arranged with intervals in the circumferential direction. Thus, this follower bearing 1 serves as a follower bearing that can further restrict relative rotation of the first member 40 to the second member 50.

In the follower bearing 1 according to this embodiment, the first sealing portions 59A and the second sealing portions 59B project in the axial direction. Thus, the follower bearing 1 according to this embodiment serves as a follower bearing that can suppress an increase in rotation torque caused by contact of each of the first sealing portions 59A and the second sealing portions 59B with the shaft 30 as the inner member in the radial direction and can stabilize the rotation torque, as compared to a case where the first sealing portions 59A and the second sealing portions 59B project radially, that is, in the radial direction, in a case where a load is applied in the radial direction. In addition, it is possible to suppress leakage of a lubricant such as grease from the inside of the bearing (a gap between the shall 30 and the outer ring 60) and entering of foreign matter into the bearing from the outside.

In the follower bearing 1 according to this embodiment, the plurality first sealing portions 59A and the second sealing portions 59B are arranged with intervals in the radial direction. Thus, the first sealing portions 59A and the second sealing portions 59B can further suppress entering of foreign matter into the bearing and leakage of, for example, grease to the outside of the bearing. Thus, the thus-configured follower bearing 1 serves as a follower bearing that can enhance the function of the first sealing portions 59A and the second sealing portions 59B as seals.

In the follower bearing 1 according to this embodiment, in a plan view along the direction in which the through holes 56 extend, at least a part of a region defined by the wall surface 57 surrounding the through holes 56 is located outside the notches 47. Thus, in placing the AE sensor, the AE sensor in the through holes 56 can be in contact with the projection 43.

In the follower bearing 1 according to this embodiment, the shaft 30 includes the body having the first raceway surface 11 and the flange 12 as the first protrusion having the annular shape whose center axis coincides with that of the first raceway surface 11, disposed at one side of the first raceway surface 11 in the axial direction, and projecting radially outward from the outer periphery of the body 10. The second member 50 includes the first portion 54A having the annular shape whose center axis coincides with that of the first raceway surface 11 and configured to enter between the flange 12 and the first member 40. Thus, the thus-configured follower bearing 1 serves as a follower bearing that can avoid contact between the flange 12 and the first member 40 in the axial direction.

In the follower bearing 1 according to this embodiment, the shaft 30 includes the side plate 20 as the second protrusion having the annular shape whose center axis coincides with that of the first raceway surface 11, disposed at the other side of the first raceway surface 11 in the axial direction, and projecting radially outward from the outer periphery of the body 10. The second member 50 includes the second portion 54B having the annular shape whose center axis coincides with the first raceway surface 11 and configured to enter between the side plate 20 and the first member 40. Thus, the thus-configured follower bearing 1 serves as a follower bearing that can avoid contact between the side plate 20 and the first member 40 in the axial direction.

In the embodiment, the follower bearing 1 includes the first sealing portions 59A and the second sealing portions 59B projecting in the radial direction. Alternatively, in the follower bearing 1, the second member 50 may include a region facing the shaft 30. The sealing portion having an annular shape whose center axis coincides with that of the first raceway surface 11 and projecting toward the shaft 30 may be formed in the region facing the shaft 30. This configuration can suppress entering of foreign mailer into the bearing and leakage of, for example, grease to the outside of the bearing. In addition, the number of parts can be reduced, as compared to a case where a sealing member as a separate component is disposed between the outer ring and the inner member. For example, the follower hearing 1 may include a first sealing portion and a second sealing portion projecting in the radial direction. Specifically, in the follower bearing L the outer peripheral surface 12A of the flange 12 having a front end serving as the outer peripheral surface of the shaft 30 and the first sealing portions 59A and the second sealing portions 59B to be in contact with the outer peripheral surface 21 of the side plate 20 may be formed in the inner peripheral surface 51 of the second member 50. Accordingly, the number of parts can be reduced, as compared to a case where a sealing member as a separate component is disposed between the outer ring 60 and the shaft 30. In addition, since the first sealing portions 59A and the second sealing portions 59B are integrated with the second member 50, it is possible to avoid detachment of the sealing member due to, for example, excessive supply of grease, as in the case of disposing a sealing member as a separate component. In this manner, the follower bearing 1 according to this embodiment serves as a follower bearing that can reduce interference of other members in contact with the outer ring 60 and reduce operating noise with a reduced number of parts.

In the follower bearing, the resin constituting the second member 50 is not specifically limited, and a resin having an abrasion resistance and a hardness, for example, appropriate for application may be employed. Specifically, the resin may be at least one resin selected from the group consisting of poly amide, polyacetal, polyphenylene sulfide, polyamide-imide, polyimide, polyether ether ketone, and a polyurethane group, for example. The resin constituting the second member 50 is preferably polyamide, polyacetal, polyphenylene sulfide, polyamide-imide, polyimide, polyether ether ketone, and polyurethane. As the resin constituting the resin constituting the second member 50, rubber (including natural rubber and synthetic rubber) may be employed. The resin constituting the second member 50 may include reinforcing fibers. As the reinforcing fibers, glass fibers and carbon fibers may be employed, for example.

Although the rollers 70 are employed as rolling elements of the follower bearing 1 in the embodiment, balls may be employed as rolling elements. Although the rolling elements are arranged in a single line in the embodiment, the rolling elements may be arranged in a plurality of lines. Although the solid shaft 30 is employed as the inner member in the embodiment, a raceway ring (inner ring), for example, may be employed as the inner member. As the second member 50, a hollow cylindrical member or a member having a spherical outer peripheral surface may also be selected as appropriate.

In the case described in the embodiment, each of the first sealing portions 59A and the second sealing portions 59B has a shape that is tapered toward the front end as illustrated in FIGS. 4 and 5 (triangle in a cross section including the center axis of the follower bearing). However, the shape of the sealing portion is not limited to this example, and any appropriate shape may be employed depending on, for example, application. As a sealing portion, a first sealing portion and a second sealing portion each of which has an arc surface in a cross section including the rotation axis of the follower bearing may be employed. A sealing portion, lip-shaped first and second sealing portions each projecting radially outward with a tilt from the inner peripheral surface 51 of the second member 50 in a cross section including the rotation axis of the follower bearing may be employed. Each of the first sealing portions 59A and the second sealing portions 59B is in contact with the shaft 30 as the inner member in the embodiment, but may not be in contact with the shaft 30 with a slight interval. Although the two first sealing portions 59A and the two second sealing portions 59B are provided, one or three or more first sealing portions 59A and one or three or more second sealing portions 59B may be provided.

Figure 6:
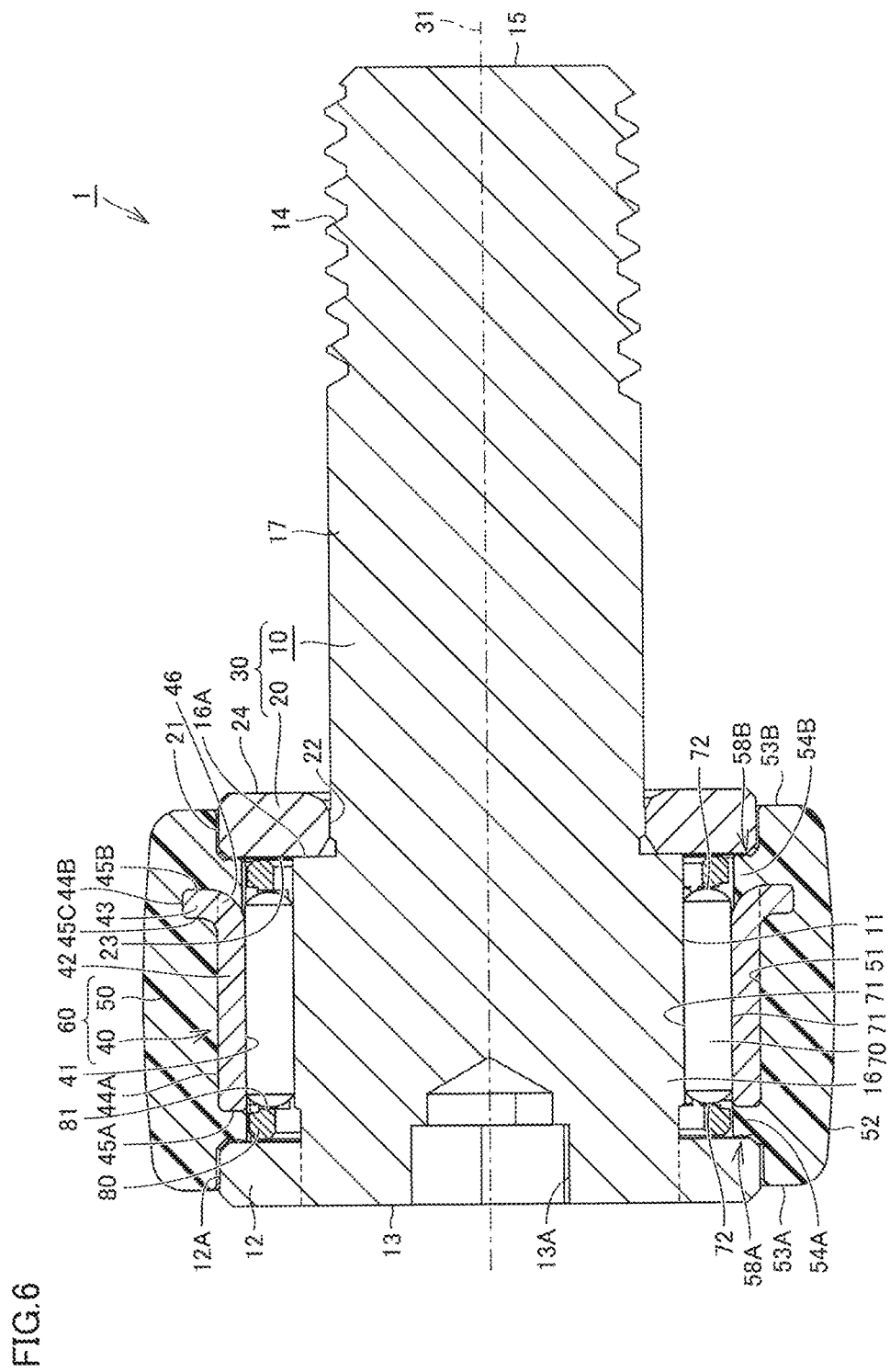
FIG. 6 is a cross-sectional view schematically illustrating a variation of a shape of a second member.

In the embodiment, the second member 50 has the through holes 56 each extending straight from outside to the projection 43. Alternatively, as illustrated in FIG. 6, the follower bearing 1 may have no through holes 56.

In the present disclosure, the follower bearing refers to a bearing in which an outer ring rotates relative to a shaft in the circumferential direction while being in contact with another member with the shaft being fixed. The other member is not specifically limited, and may be, for example, a cam, a rail, or a belt.

It should be understood that the embodiments disclosed here are illustrative and non-restrictive in every respect. The scope of the present invention is defined by the claims and is intended to include any modifications within the scope and meaning equivalent to the claims.

DESCRIPTION OF REFERENCE CHARACTERS 1 follower bearing, 10 body, 11 first raceway surface, 12 flange, 12A outer peripheral surface, 13, 45A first end face, 13A hexagonal hole, 14 screw portion, 15 second end face, 16 large diameter portion, 16A step surface, 17 shaft, 20 side plate, 21 outer peripheral surface, 22 inner peripheral surface, 23 first end face, 24 second end face, 30 shaft (inner member), 31 rotation axis, 40 first member, 41 first raceway surface, 42 cylindrical portion, 43 projection, 44A, 44B outer peripheral surface, 45A first end face, 45B second end face, 45C side surface, 46 end, 50 second member, 51 inner peripheral surface, 52 outer peripheral surface, 53A first end face, 53B second end face, 54A first portion, 54B second portion, 56 through hole, 57 wall surface, 58A first region, 58B second region, 59A first sealing portion, 59B second sealing portion, 60 outer ring, 70 roller, 71 outer peripheral surface, 72 end face, 80 cage, 81 pocket.

The invention claimed is:
1. A follower bearing comprising:
   an inner member having an outer peripheral surface, the outer peripheral surface including an annular first raceway surface;
   an outer ring having an inner peripheral surface, the inner peripheral surface including an annular second raceway surface facing the first raceway surface; and
   a plurality of rolling elements disposed in an annular raceway arranged between the first raceway surface and the second raceway surface with the rolling elements contacting the first raceway surface and the second raceway surface, wherein
   the outer ring includes
      a steel annular first member, and
      a resin annular second member and covering an outer peripheral surface of the first member,
   the first member includes
      a cylindrical portion having a hollow cylindrical shape and including the second raceway surface, the cylindrical portion having an annular first end surface at a first end of the first member, and
      a projection located at a second end of the first member opposite the first end surface of the cylindrical portion and extending radially outward from the cylindrical portion, the projection having an annular side surface facing toward the first end of the first member, and an annular second end surface located opposite the annular side surface, and
   wherein the second member covers the first end portion of the cylindrical portion of the first member, the annular side surface of the projection, and at least a portion of the annular second end surface of the projection.
2. The follower bearing according to claim 1, wherein the second member has a through hole extending through the second member and to the projection.

3. The follower bearing according to claim 2, wherein the through hole penetrates the second member an the axial direction of the inner member.

4. The follower bearing according to claim 1, wherein the inner member includes
a body including the first raceway surface, and
a first protrusion having an annular shape whose center axis coincides with that of the first raceway surface, disposed at one side of the first raceway surface in an axial direction of the inner member, and projecting radially outward from an outer periphery of the body, and
the second member includes a first portion having an annular shape whose center axis coincides with that of the first raceway surface and configured to enter between the first protrusion and the first member.

5. The follower bearing according to claim 4, wherein
the inner member includes a second protrusion having an annular shape whose center axis coincides with that of the first raceway surface, disposed at another side of the first raceway surface in an axial direction of the inner member, and projecting radially outward from the outer periphery of the body, and
the second member includes a second portion having an annular shape whose center axis coincides with that of the first raceway surface and configured to enter between the second protrusion and the first member.

6. The follower bearing according to claim 1, wherein
the second member has a region facing the inner member, and
a sealing portion having an annular shape whose center axis coincides with that of the first raceway surface and projecting toward the inner member is formed in the region facing the inner member.

7. The follower bearing according to claim 1, wherein the resin constituting the second member is at least a resin selected from the group consisting of polyamide, polyacetal, polyphenylene sulfide, polyamide-imide, polyimide, polyether ether ketone, and polyurethane.

8. The follower bearing according to claim 1, wherein the rolling element is a roller.

9. A follower bearing comprising:
an inner member having an outer peripheral surface, the outer peripheral surface including an annular first raceway surface;
an outer ring having an inner peripheral surface, the inner peripheral surface including an annular second raceway surface facing the first raceway surface; and
a plurality of rolling elements disposed in an annular raceway arranged between the first raceway surface and the second raceway surface with the rolling elements contacting the first raceway surface and the second raceway surface, wherein
the outer ring includes
a steel annular first member, and
a resin annular second member and covering an outer peripheral surface of the first member,
the first member includes
a cylindrical portion having a hollow cylindrical shape and including the second raceway surface, and
a projection extending radially outward from the cylindrical portion,
wherein the second member is disposed on both sides of the projection in an axial direction of the inner member, and
wherein the inner member includes
a body including the first raceway surface, and
a first protrusion having an annular shape whose center axis coincides with that of the first raceway surface, disposed at one side of the first raceway surface in the axial direction of the inner member, and projecting radially outward from an outer periphery of the body, and
the second member includes a first portion having an annular shape whose center axis coincides with that of the first raceway surface and configured to enter between the first protrusion and the first member.

* * * * *